United States Patent
Khafizov et al.

(10) Patent No.: US 12,524,031 B2
(45) Date of Patent: Jan. 13, 2026

(54) SYSTEMS AND METHODS FOR PRIORITIZING POWER RESTORATION TO SITES AFTER A POWER OUTAGE

(71) Applicant: Verizon Patent and Licensing Inc., Basking Ridge, NJ (US)

(72) Inventors: Farid Khafizov, Plano, TX (US); Jean Rosebert Beaublanc, Warner Robins, GA (US); Halley David Allred, South Weber, UT (US); Muhammad Ibraheem, Cypress, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 500 days.

(21) Appl. No.: 18/051,249

(22) Filed: Oct. 31, 2022

(65) Prior Publication Data
US 2024/0143011 A1    May 2, 2024

(51) Int. Cl.
*G05F 1/66*    (2006.01)
*G05B 19/042*    (2006.01)

(52) U.S. Cl.
CPC ............. *G05F 1/66* (2013.01); *G05B 19/042* (2013.01); *G05B 2219/2639* (2013.01)

(58) Field of Classification Search
CPC .. G05F 1/66; G05B 19/042; G05B 2219/2639
See application file for complete search history.

(56) References Cited

U.S. PATENT DOCUMENTS

| | | | |
|---|---|---|---|
| 2013/0051239 A1* | 2/2013 | Meredith | H04W 16/18 370/241 |
| 2016/0007217 A1* | 1/2016 | Kapnadak | H04W 28/0236 455/437 |
| 2020/0045627 A1* | 2/2020 | Wolfe | H04L 5/0092 |

* cited by examiner

*Primary Examiner* — Rami R Okasha

(57) ABSTRACT

A device may determine a number of user equipments (UEs) connected to an inactive site during a first period of time and determine that the inactive site experienced a power outage during a second period of time. The device may determine that the UEs connected to a set of active sites during the second period of time. The device may determine one or more key performance indicator (KPI) changes to one or more KPIs, during the second period of time, for each of the set of active sites. The device may determine a plurality of weights associated with the inactive site experiencing the power outage; determine a set of impacts, of the inactive site, on the one or more KPI changes for the set of active sites based on the plurality of weights; and cause power to be restored to the inactive site based on the set of impacts.

20 Claims, 10 Drawing Sheets

180
Adjust magnitudes of impacts on KPIs for the outage neighbor sites

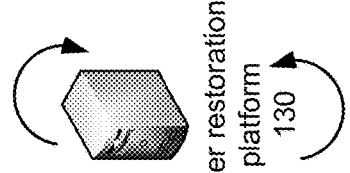

Power restoration platform
130

185
Compare a particular vector associated with KPIs and a vector associated with adjusted impacts for each inactive site

| | Inactive site 1 | Inactive site 2 | Inactive site 3 | Inactive site 4 | Worst Case |
|---|---|---|---|---|---|
| KPI0 | 0.7 | 0.9 | 0.8 | 1.0 | 1.0 |
| KPI1 | 0.9 | 0.3 | 1.0 | 0.4 | 1.0 |
| KPI2 | 0.5 | 0.4 | 1.0 | 0.1 | 1.0 |

| | Inactive Site | Distance to Worst Case |
|---|---|---|
| 0 | Inactive Site 1 | 1.49864 |
| 1 | Inactive Site 2 | 1.44878 |
| 2 | Inactive Site 3 | 3.61631 |
| 3 | Inactive Site 4 | 2.22879 |

FIG. 1F

SYSTEMS AND METHODS FOR PRIORITIZING POWER RESTORATION TO SITES AFTER A POWER OUTAGE

BACKGROUND

Wireless networks may include base stations that provide wireless services to user equipment. The wireless networks may include Long-Term Evolution (LTE) networks, or Fifth Generation (5G) networks, among other examples. The base stations consume energy (e.g., electrical power) in order to provide the wireless services to the user equipment. In some situations, the base stations may experience a power outage. The power outage may disrupt the wireless services provided by the base stations.

BRIEF DESCRIPTION OF THE DRAWINGS

FIGS. 1A-1G are diagrams of an example associated with prioritizing power restoration to sites after a power outage.

DETAILED DESCRIPTION OF PREFERRED EMBODIMENTS

Figure 1A:
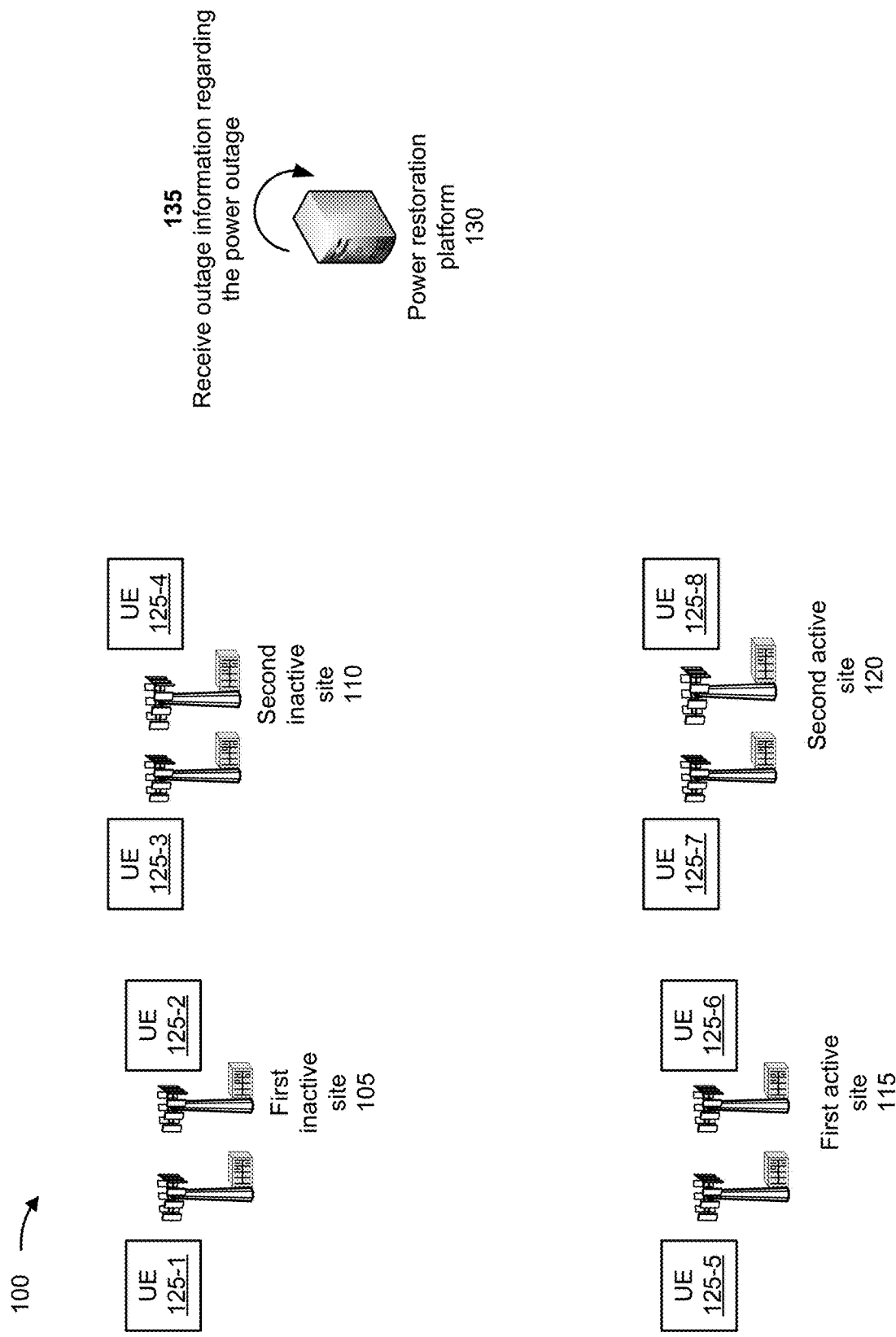

The following detailed description of example implementations refers to the accompanying drawings. The same reference numbers in different drawings may identify the same or similar elements.

Multiple sites may experience a power outage. Each site may include one or more LTE evolved NodeBs (eNodeBs). The power outage may occur as a result of a storm, a tornado, a hurricane, and/or a similar natural disaster causing damages to an underlying power supply structure. Until the underlying power supply structure is repaired, field engineers may attempt to restore power to one or more of the sites using power generating equipment (e.g., mobile power generators).

The power generating equipment is expensive. Additionally, quantities of the power generating equipment are limited. Due to the cost and the limited quantities of the power generating equipment, a priority must be determined with respect to sites that are to be restored using the power generating equipment. Currently, field engineers rely on their experience and knowledge of an area associated with the sites to determine an order with respect to restoring power to the sites (e.g., determine a priority associated with restoring power to the sites). The field engineers may determine that power should be restored to such sites prior to other sites.

In some instances, the knowledge of the area, of the field engineers, may not be up to date due to infrastructural changes to the area (e.g., new and/or additional locations for the hospitals, the schools, the police stations, or the shelters, among other examples). Additionally, or alternatively, field engineers may not be available to provide their insights regarding an order for restoring power to the sites. As a result, power may be restored to the sites in an improper order. For example, power may be restored to a first site prior to a second site that should have been prioritized over the first site. Restoring sites in this manner may consume resources for re-determining a proper order for restoring power to the sites, consume resources for identifying additional power generating equipment and providing power to sites that should have been prioritized, consume resources used to remedy network issues created by restoring power to sites in an improper order, among other examples.

Implementations described herein are directed to prioritizing power restoration to sites after a power outage. Each site may include one or more base stations (e.g., one or more eNodeBs). A site that is experiencing the power outage may be referred to as an "inactive site." A site that is not experiencing the power outage may be referred to as an "active site." Implementations described herein are directed to prioritizing the power restoration based on a distribution of user equipment (UEs) between inactive sites and active sites before and during the power outage, based on key performance indicator (KPI) changes to KPIs of the active sites as a result of the power outage, and/or based on impacts of the inactive sites on the KPI changes to the KPIs of the active sites.

For example, a power restoration platform may detect that UEs that were connected to an inactive site prior to the power outage, have connected to a set of active sites (e.g., one or more active sites) during the power outage. A subset of active sites may be referred to as "outage neighbor sites." The UEs connecting to the set of active sites may cause KPI changes to one or more KPIs of each active site of the set of active sites. In other words, the UEs connecting to the set of active sites may negatively affect the one or more KPIs of each active site of the set of active sites. In some examples, the one or more KPIs may include a KPI relating to an amount of energy consumed by the set of active sites. Alternatively, the amount of energy consumed by the set of active sites may be evaluated separately from the one or more KPIs.

The power restoration platform may determine a weight, associated with the inactive site experiencing the power outage, for each active site of the set of active sites. For example, the weight, associated with the inactive site, for an active site may indicate a measure of contribution of the inactive site to the KPI changes of the active site. The weight may be determined based on a first number of UEs and a second number of UEs. The first number of UEs may be a first number of UEs that were connected to the inactive site during a first period of time and that have been connected to the active site during a second period of time associated with the power outage. The second number of UEs may be a total number of UEs connected to the active site during the second period of time. In some situations, the power restoration platform may determine the weight associated with each base station of the inactive site and determine the weight associated with the inactive site based on a combination of the weights associated with the base stations of the inactive site.

The power restoration platform may determine a set of impacts, of the inactive site, on the one or more KPIs for the set of active sites. For example, the power restoration platform may determine a first cumulative impact of the inactive site on a first KPI change of a first KPI for all active sites of the set of active sites; determine a second cumulative impact of the inactive site on a second KPI change of a second KPI for all active sites of the set of active sites; and so on. The set of impacts may be determined based on the weight determined for each active site of the set of active sites. In some situations, the power restoration platform may determine the set of impacts for each base station of the inactive site and determine the set of impacts for the inactive site based on a combination of the set of impacts for the base stations of the inactive site.

In some situations, the power restoration platform may adjust a magnitude of each impact, of the set of impacts, to obtain an adjusted set of impacts. The power restoration platform may compare a first vector associated with impacts on KPIs and a second vector associated with the adjusted set of impacts. The one or more KPIs, associated with the set of active sites, may be same as the KPIs associated with the first vector. In some examples, the first vector may represent worst case scenario impacts on the KPIs (e.g., most significant impacts on the KPIs). In some situations, the power restoration platform may determine a distance between the first vector and the second vector based on the comparison.

Based on the comparison (e.g., based on the distance), the power restoration platform may determine a priority associated with restoring the power to the inactive site. As example, the power restoration platform may cause the power to be restored to a first inactive site before a second inactive site based on the distance determined for the second inactive site exceeding the distance determined for the first inactive site. By prioritizing power restoration in this manner, implementations described herein preserve resources that would have been consumed by re-determining a proper for restoring the sites, by identifying additional power generating equipment and providing power to sites that should been prioritized, by remedying network issues created by restoring power to sites in an improper order, among other examples.

FIGS. 1A-1G are diagrams of an example 100 associated with prioritizing power restoration to sites after a power outage. As shown in FIGS. 1A-1G, example 100 includes a first inactive site 105, a second inactive site 110, a first active site 115, a second active site 120, a plurality of UEs 125 (e.g., UEs 125-1 to 125-8), and a power restoration platform 130. UEs 125 may be individually referred to as UE 125. In some examples, first inactive site 105, second inactive site 110, first active site 115, and second active site 120 may be part of a wireless network (e.g., an LTE network or a 5G network, among other examples). First inactive site 105, second inactive site 110, first active site 115, and second active site 120 may be associated with a network service provider.

First inactive site 105 may include one or more base stations. The one or more base stations may include one or more eNodeBs, or one or more 5G next generation NodeB (gNodeBs), among other examples. For example, an eNodeB may be a base station included in an LTE network. A gNodeB may be a base station included in a 5G network. As shown in FIG. 1A, prior to a power outage, one or more UEs 125 (e.g., UE 125-1 and UE 125-2) may be connected to the one or more base stations of first inactive site 105. Second inactive site 110 may be similar to first inactive site 105. As shown in FIG. 1A, prior to the power outage, one or more UEs 125 (e.g., UE 125-3 and UE 125-4) may be connected to the one or more base stations of second inactive site 110.

First active site 115 may include one or more base stations. The one or more base stations may include one or more eNodeBs, or one or more gNodeBs, among other examples. As shown in FIG. 1A, one or more UEs 125 (e.g., UE 125-5 and UE 125-6) may be connected to the one or more base stations of first active site 115. Second active site 120 may be similar to first active site 115. As shown in FIG. 1A, one or more UEs 125 (e.g., UE 125-7 and UE 125-8) may be connected to the one or more base stations of second active site 120.

As shown in FIG. 1A, and by reference number 135, power restoration platform 130 may receive outage information regarding the power outage. In some implementations, power restoration platform 130 may receive the outage information from a device of a network administrator of the network service provider. In some examples, the outage information may indicate that the power outage has occurred in a geographical area. The outage information may further indicate a period of time (e.g., a date and/or a time) during which the power outage occurred. The outage information may identify the geographical area and the geographical area may include geographical locations of inactive sites experiencing the power outage and geographical locations of active sites that are not experiencing the power outage.

Figure 1B:
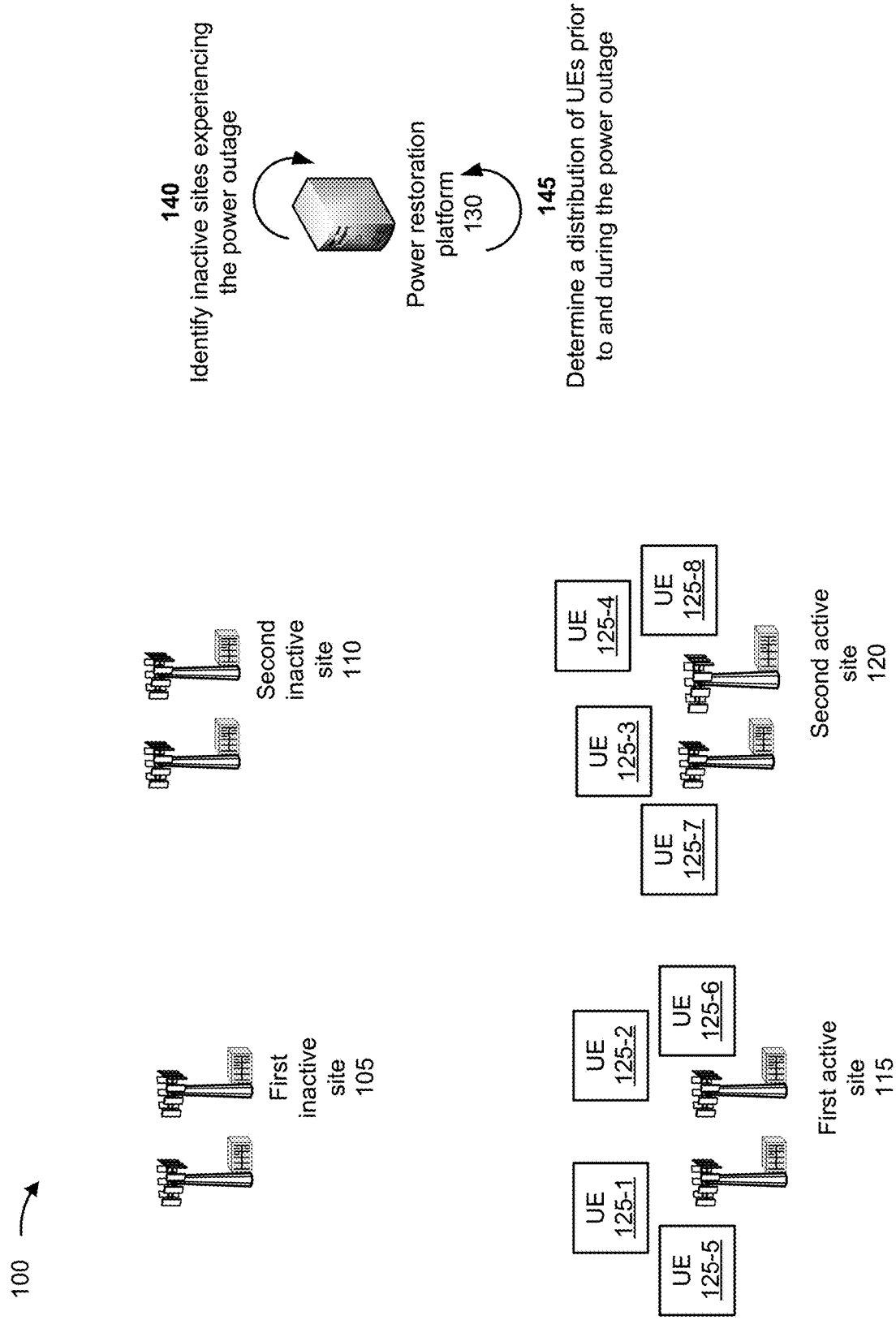

As shown in FIG. 1B, and by reference number 140, power restoration platform 130 may identify inactive sites experiencing the power outage. For example, power restoration platform 130 may analyze the outage information to identify inactive sites that are experiencing the power outage. For example, based on analyzing the outage information, power restoration platform 130 may identify first inactive site 105 and second inactive site 110 as inactive sites and may identify first active site 115 and second active site 120 as active sites. As shown in FIG. 1B, UEs 125 (connected to first inactive site 105 and second inactive site 110 prior to the power outage) are connected to first active site 115 and second active site 120.

As shown in FIG. 1B, and by reference number 145, power restoration platform 130 may determine a distribution of UEs prior to and during the power outage. For example, based on determining that the power outage has occurred, power restoration platform 130 may obtain UE connectivity information from one or more devices of the wireless network (e.g., first active site 115, second active site 120, one or more UEs 125, the device of the network administrator, among other examples). The UE connectivity information may identify a number of UEs 125 connected to each site located in the geographical area over a period of time.

Figure 1C:
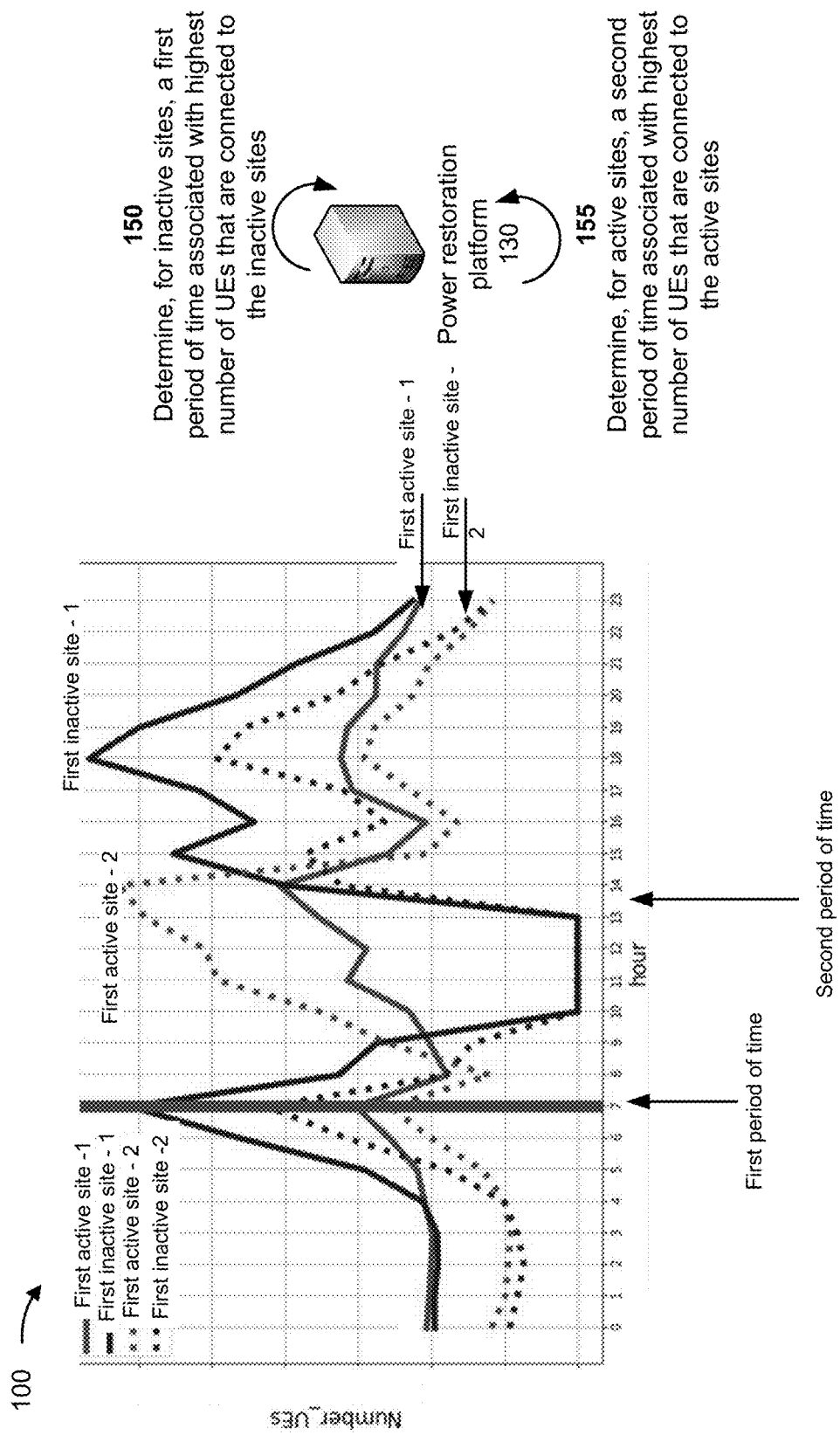

As shown in FIG. 1C, and by reference number 150, power restoration platform 130 may determine, for the inactive sites, a first period of time associated with a highest number of UEs that are connected to the inactive sites. In some situations, for each base station in the geographical area, power restoration platform 130 may generate time series data representing a number of UEs 125 (e.g., unique UEs 125) connected to the base station as a function of time. For example, as shown in FIG. 1C, power restoration platform 130 may generate time series data representing a number of UEs 125 (e.g., unique UEs 125) connected to a first base station of first inactive site 105 over a period of time (e.g., a 24-hour period of time), power restoration platform 130 may generate time series data representing a number of UEs 125 (e.g., unique UEs 125) connected to a second base station of first inactive site 105 over the period of time, generate time series data representing a number of UEs 125 (e.g., unique UEs 125) connected to a second base station of second inactive site 110 over the period of time, and so on.

In some examples, power restoration platform 130 may analyze the time series data, for the inactive sites, to determine the first period of time associated with the highest number of unique UEs 125 that were connected to the inactive sites during a period of time that precedes the power outage. As shown in FIG. 1C, the power outage occurs after hour number 10. In this regard, the highest number of UEs 125 are connected to the first base station and the second base station of first inactive site 105 during hour number 7

(which precedes hour number 10). As an example, the first period of time may be a period of time that includes hour number 7.

As shown in FIG. 1C, and by reference number 155, power restoration platform 130 may determine, for the active sites, a second period of time associated with a highest number of UEs that are connected to the active sites. In some examples, power restoration platform 130 may analyze the time series data, for the active sites, to determine the second period of time associated with the highest number of unique UEs that are connected to the active sites during a period of time that follows the power outage. The second period of time may correspond to a period of time during which all or most UEs, previously connected to inactive sites, have been connected to active sites. As shown in FIG. 1C, the highest number of UEs 125 are connected to a first base station and a second base station of first active site 115 during hour number 13 (which follows hour number 10). As an example, the second period of time may start at hour number 13 and end at hour number 14.

Figure 1D:
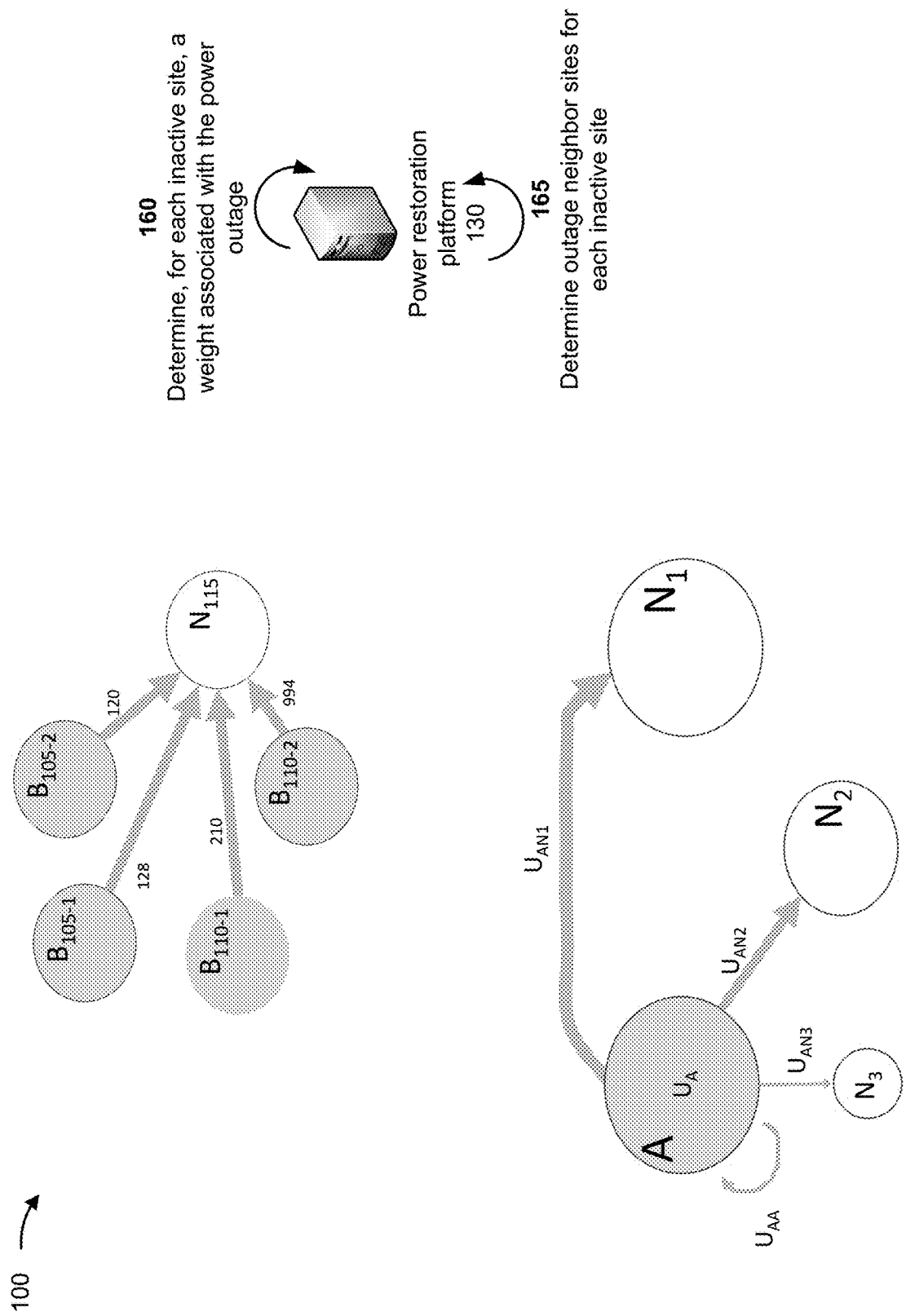

As shown in FIG. 1D, and by reference number 160, power restoration platform 130 may determine, for each inactive site, a weight associated with the power outage. In some implementations, power restoration platform 130 may determine the weight for each base station of each inactive site with respect to each base station of one or more active sites. In this regard, the weight for a base station of an inactive site with respect to a base station of an active site may indicate a measure of contribution of the base station of the inactive site to a KPI change of the base station of the active site. The measure of contribution may be based on UEs 125, previously connected to the inactive site that have been connected to the active site as a result of the power outage.

In some instances, power restoration platform 130 may determine the weight, for each base station of each inactive site, using the UE connectivity information. As an example, for a first base station of first inactive site 105, power restoration platform 130 may analyze the UE connectivity information to determine a first number of UEs 125, connected to the first base station during the first period of time, that have been connected to the first base station of first active site 115 during the second period of time. The first number may indicate the number of UEs 125 that are common to the first base station of first inactive site 105 (during the first period of time) and to the first base station of first active site 115 during the second period of time.

Power restoration platform 130 may further analyze the UE connectivity to determine a second number of UEs 125 connected to the first base station of first active site 115 during the second period of time. The second number of UEs 125 may be a total number of UEs 125 (e.g., distinct UEs 125) connected to the first base station of first active site 115 during the second period of time. Power restoration platform 130 may determine the weight of the first base station of first inactive site 105 with respect to the first base station of first active site 115 using the first number and the second number.

In some examples, power restoration platform 130 may determine the weight for a base station of an inactive site with respect to a base station of an active site using the following formula:

$$W\_\{bh1rh2\}=N\_\{bh1rh2\}/SUM\_b\_N\_\{bh1rh2\}$$

Where $W\_\{bh1rh2\}$ represents the weight, $N\_\{bh1rh2\}$ represents the number of UEs 125 common between a base station of an inactive site (during the first period of time) and a base station of an active site during the second period of time, $SUM\_b\_N\_\{bh1rh2\}$ represents the sum of the number of UEs 125 common between each base station of each inactive site (during the first period of time) and the base station of the active site during the second period of time.

In some implementations, power restoration platform 130 may determine the weight using the above formula when the number of common UEs 125 does not satisfy a number threshold. For example, the weight may be determined using the above formula when the number of common UEs 125 is small. The number of common UEs 125 may be small when the periods of time discussed herein are small. For example, the number of common UEs 125 may be small when the periods of time do not satisfy a time threshold. With respect to the example illustrated in FIG. 1D, 128 is the number of UEs 125 common between the first base station of inactive site 105 (during the first period of time) and a base station of active site 115 during the second period of time; 120 is the number of UEs 125 common between the second base station of inactive site 105 (during the first period of time) and the base station of active site 115 during the second period of time; 210 is the number of UEs 125 common between the first base station of inactive site 110 (during the first period of time) and the base station of active site 115 during the second period of time; and 994 is the number of UEs 125 common between the second base station of inactive site 110 (during the first period of time) and the base station of active site 115 during the second period of time.

Continuing with the example, power restoration platform 130 may determine the weight, for the first base station of inactive site 105, as 128/(120+128+210+994) or 128/1452. Accordingly, power restoration platform 130 may determine the weight, for the first base station of inactive site, to be approximately 0.088815427.

Alternatively to determining the weight as explained above, power restoration platform 130 may determine the weight, for a base station of an inactive site, with respect to a base station of an active site using the following formula:

$$W\_\{bh1rh2\}=N\_\{bh1rh2\}/N\_\{rh2\}$$

Where $W\_\{bh1rh2\}$ represents the weight, $N\_\{bh1rh2\}$ represents the number of UEs 125 common between a base station of an inactive site (during the first period of time) and a base station of an active site during the second period of time, and $N\_\{rh2\}$ represents the number of distinct UEs 125 connected to the base station of the active site during the second period of time.

In some implementations, power restoration platform 130 may determine the weight using the above formula when the number of common UEs 125 satisfies the number threshold. For example, the weight may be determined using the above formula when the number of common UEs 125 is large. Power restoration platform 130 may determine the weight, for each base station of each inactive site, with respect to each base station of each active site in the same manner. Power restoration platform 130 may determine the weight, for an inactive site, with respect to an active site by combining the weight for each base station of the inactive site, with respect to each base station of the active site.

As shown in FIG. 1D, and by reference number 165, power restoration platform 130 may determine outage neighbor sites for each inactive site. In some implementations, power restoration platform 130 may determine the outage neighbor sites for an inactive site based on the weight, for the inactive site, with respect to each active site. As explained above, the weight, for the inactive site, with respect to an active site may be determined based on a number of UEs 125 common between the inactive site (during the first period of time) and the active site (during the second period of time). Accordingly, power restoration platform 130 may determine that the active site is an outage neighbor site of the inactive site based on the number of UEs 125 (common between the inactive site and the active site) satisfying one or more number thresholds.

With respect to the example illustrated in FIG. 1D, power restoration platform 130 may determine an outage neighbor site if $U_{AN}/U_A > \text{Tpct}$ and if $U_{AN} > T_{abs}$. In the example, A represents an inactive site, $U_A$ represents the number of UEs 125 connected to A during the first period, $N_1$ represents a first active site, $U_{AN1}$ represents a number of UEs 125 common between A (during the first period of time) and $N_1$ (during the second period of time), $N_2$ represents a second active site, and so on. $T_{pct}$ is a percentage threshold and $T_{ab}$ is an absolute threshold.

Continuing with the example, if $U_{AN1}=100$, $U_A=500$, Tpct=0.3, and $T_{abs}=50$, then $U_{AN1}/U_A=100/500=0.5$ which is greater than $T_{pct}$, and 100 is greater than $T_{abs}$. Accordingly, power restoration platform 130 may determine that active site $N_1$ is an outage neighbor site of inactive site A. Power restoration platform 130 may perform similar computations for other active sites (e.g., $N_2$ and $N_3$).

In some examples, power restoration platform 130 may determine the outage neighbor sites, of an inactive site, as active sites associated with highest weights (e.g., active sites associated with a highest three weights, or active sites associated with a highest five weights, among other examples). Alternatively, power restoration platform 130 may determine the outage neighbor sites of the inactive site, as active sites associated with weights that satisfy a weight threshold. In some instances, the weight threshold may be determined by the network administrator.

Active sites (that have been identified as outage neighbor sites) may be included in a set of active sites representing the outage neighbor sites based on the number of UEs 125 (common between the inactive site and the active site) satisfying the one or more number thresholds. The quantity of outage neighbor sites for an inactive site may be configurable (e.g., configurable by the network administrator).

As an example, power restoration platform 130 may determine that first active site 115 is an outage neighbor site of first inactive site 105 and second active site 120 is an outage neighbor site of second inactive site 110. In this regard, first active site 115 and second active site 120 may be part of a set of outage neighbor sites (or a set of active sites) for first inactive site 105 and second inactive site 110.

Figure 1E:
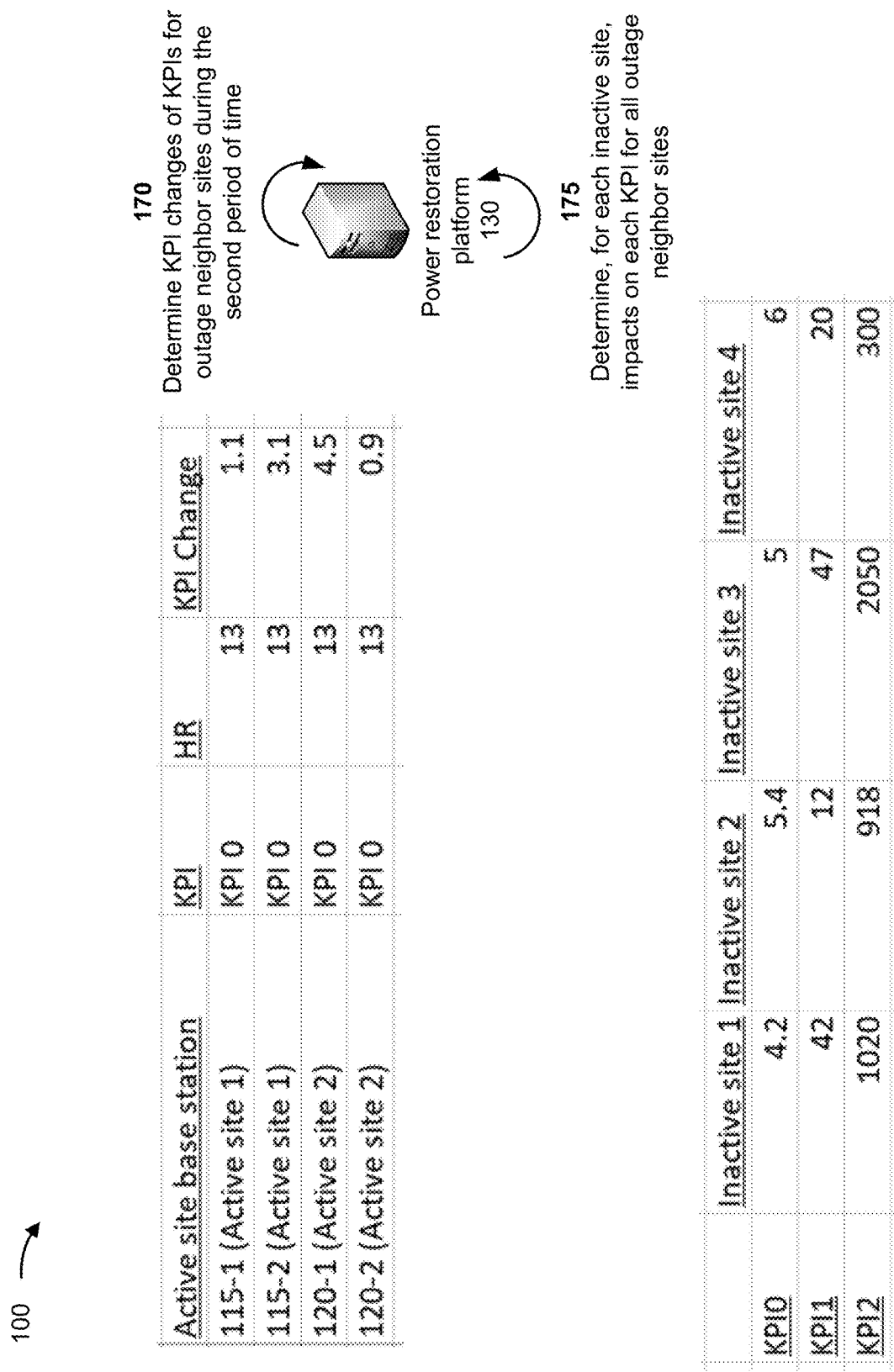

As shown in FIG. 1E, and by reference number 170, power restoration platform 130 may determine KPI changes of KPIs for outage neighbor sites during the second period of time. For example, power restoration platform 130 may determine KPI changes, to KPIs of the outage neighbor sites that occurred during the second period of time (e.g., KPI changes to KPIs of each base station of the outage neighbor sites during the second period of time). In some implementations, power restoration platform 130 may determine the KPI changes using KPI information obtained from one or more devices of the wireless network (e.g., from the base stations of the active sites, or from UEs 125, among other examples).

As an example, the KPI information may identify KPI measurements, over different periods of times, for different KPIs for each base station of each outage neighbor site. In some implementations, the different KPIs (for an outage neighbor site) may include a KPI relating to an amount of energy consumed by the outage neighbor site, a KPI relating to accessibility of the wireless network associated with the outage neighbor site, a KPI relating to experience of users while utilizing the wireless network, and/or a KPI relating to retaining services of users, among other examples. For example, the amount of energy consumed by the outage neighbor site may increase as a result of the power outage (e.g., as a result of UEs 125, from an inactive site, connecting to the outage neighbor site).

In some implementations, power restoration platform 130 may determine a KPI change for a KPI of a base station of an outage neighbor site based on outage KPI data for the KPI and baseline KPI data for the KPI. The outage KPI data and the baseline KPI data may be included in the KPI information. The outage KPI data may correspond to measurements of the KPI during the second period of time (e.g., 4 measurements, 6 measurements, or 10 measurements, among other examples). The baseline KPI data may correspond to measurements of the KPI during the second period of time of one or more days prior to a day during which the power outage occurred (e.g., measurements of the KPI during hour number 13 of the one or more days prior to the day during which the power outage occurred).

In some implementations, power restoration platform 130 may determine the KPI change using the formula:

$$KPI_{change} = \text{Stat}(X)/\text{Stat}(Y),$$

where $KPI_{change}$ is the KPI change, Stat (X) is the outage KPI data, the measurements (during the second period of time on the day of the power outage) are represented by Y, Stat (Y) is the baseline KPI data, and the measurements (during the second period of time over the one or more days prior to the day of the power outage) are represented by Y.

In some implementations, power restoration platform 130 may determine the KPI change using the formula:

$$KPI_{change} = \text{Stat}(X) - \text{Stat}(Y),$$

where $KPI_{change}$ is the KPI change, Stat (X) is the outage KPI data, the measurements (during the second period of time on the day of the power outage) are represented by Y, Stat (Y) is the baseline KPI data, and the measurements (during the second period of time over the one or more days prior to the day of the power outage) are represented by Y.

In some implementations, power restoration platform 130 may determine the KPI change using the formula:

$$KPI_{change} = E(X^2)/Y(Y^2),$$

where $KPI_{change}$ is the KPI change, the measurements (during the second period of time on the day of the power outage) are represented by Y, $E(X^2)$ is a second moment calculation using X, the measurements (during the second period of time over the one or more days prior to the day of the power outage) are represented by Y, and $E(Y^2)$ is a second moment calculation using Y.

In some examples, $E(X^2)$ may capture averages as well as variation of X. Similarly, $E(Y^2)$ may capture averages as well as variation of Y. In some implementations, power restoration platform 130 may determine the KPI change when the outage KPI data satisfies a KPI. Power restoration platform 130 may determine the KPI change for each KPI of each base station of the outage neighbor site in a same manner. In this regard, power restoration platform 130 may determine a KPI change for a particular KPI of the outage neighbor site by combining the KPI change for the particular KPI for each base station of the outage neighbor site.

As shown in FIG. 1E, and by reference number 175, power restoration platform 130 may determine, for each inactive site, impacts on each KPI for all outage neighbor sites. In some implementations, power restoration platform 130 may determine impacts on each KPI (or on each KPI change of each KPI) based on the KPI changes and the weights determined as explained herein. In some examples, power restoration platform 130 may determine an impact, of an inactive site, on a particular KPI change of a particular KPI of an outage neighbor site using the particular KPI change and the weight of the inactive site associated with the outage neighbor site.

For example, power restoration platform 130 may determine the impact of the inactive site on the KPI change using the following formula:

$$F(\text{inactive site}, KPI, \text{active site}) = \text{Weight}_{inactive\_active} * KPI_{change},$$

where $\text{Weight}_{inactive\_active}$ represents the weight of the inactive site associated with the outage neighbor site and $KPI_{change}$ represents the particular KPI change.

Power restoration platform 130 may determine the impact of the inactive site on the particular KPI change, of the particular KPI, for all outage neighbor sites in a similar manner. In this regard, power restoration platform 130 may determine a cumulative impact, on the particular KPI change of the particular KPI, for all outage neighbor sites by combining (e.g., adding) the impact of the inactive site on the particular KPI change, of the particular KPI, determined for each of the outage neighbor sites.

Power restoration platform 130 may determine a cumulative impact, on each KPI change of each KPI, for all outage neighbor sites in a similar manner. In this regard, power restoration platform 130 may determine a set of impacts, for the inactive site, that includes a first cumulative impact, on a first KPI change of a first KPI, for all outage neighbor sites; a second cumulative impact, on a second KPI change of a second KPI, for all outage neighbor sites; and so on. Power restoration platform 130 may determine a set of impacts, for each inactive site, in a similar manner.

As an example, power restoration platform 130 may determine a cumulative impact, on a KPI change of a KPI, for all outage neighbor sites of an inactive site using the formula:

$$G(KPI, \text{BLUE}) = \sum_{RED} f(KPI, \text{BLUE}, \text{RED})$$

Where KPI represents the KPI, BLUE represents the inactive site, RED represents an outage neighbor site of the inactive site, and $f(KPI, \text{BLUE}, \text{RED})$ represents the KPI change for the KPI.

As shown in FIG. 1E, for example, the cumulative impact of inactive site 105 (or inactive site 1) on a KPI change of KPI0, for all outage neighbor sites of inactive site 105, is 4.2. As another example, the cumulative impact of inactive site 110 (or inactive site 2) on a KPI change of KPI0, for all outage neighbor sites of inactive site 120, is 5.4.

As shown in FIG. 1F, and by reference number 180, power restoration platform 130 may adjust magnitudes of impacts on KPIs for the outage neighbor sites. In some implementations, a first magnitude of a cumulative impact, of a first inactive site, on a particular KPI change may be different than a second magnitude of a cumulative impact, of a second inactive site, on the particular KPI change. In this regard, power restoration platform 130 may identify a particular cumulative impact of a highest magnitude for the particular KPI and divide the cumulative impact, of each inactive site, by the particular cumulative impact.

As an example, referring back to FIG. 1E and with respect to KPI0, a cumulative impact with a highest magnitude for KPI0 is 6 (caused by inactive site 4). In this regard, and referring back to FIG. 1F, the magnitudes of the cumulative impacts for the inactive sites will be adjusted by 6. For example, the magnitude of the cumulative impact for inactive site 1 will be 4.2/6 which is equal to 0.7. As another example, the magnitude of the cumulative impact for inactive site 2 will be 5.4/6 which is equal to 0.9.

In this regard, a value of the cumulative impact with the most impact on a particular KPI change will be adjusted to 1. As shown in FIG. 1F, for example, the magnitude of the cumulative impact for inactive site 4 will be 6/6 which is equal to 1. Power restoration platform 130 may adjust the cumulative impacts for each KPI change in a similar manner.

As shown in FIG. 1F, and by reference number 185, power restoration platform 130 may compare a particular vector associated with KPIs and a vector associated with adjusted impacts for each inactive site. In some examples, the particular vector may be a vector that includes values of cumulative impacts for the KPI changes identified for the outage neighbor sites. Each of the values may indicate a cumulative impact with the most impact for each KPI change. As explained above, a value of the cumulative impact with the most impact on the particular KPI change will be 1. Accordingly, for each KPI change identified by the particular vector, the value may be 1.

As an example, the values of the particular vector may be obtained from the Worst Case column as shown in FIG. 1F. For instance, power restoration platform 130 may determine the particular vector as follows $\vec{g}_{worst} = \vec{1} = [1, 1, \ldots, 1]^T$. The vector associated with the adjusted cumulative impacts, for an inactive site, may include the adjusted impacts for each KPI change. As an example, power restoration platform 130 may determine a vector, for the inactive sites, as follows $G = [g_{inactivesite1}, g_{inactivesite2}, \ldots, g_{inactivesiteN}]$. For instance, $g_{inactivesite1}$ may include the values of cumulative impacts inactive site 1 (e.g., 0.7, 0.9, 0.5, etc.), $g_{inactivesite2}$ may include the values of cumulative impacts inactive site 2 (e.g., 0.9, 0.3, 0.4, etc.), and so on.

When comparing the particular vector and the vector for the inactive site, power restoration platform 130 may compare values for each respective KPI change. For example, power restoration platform 130 may compare the particular vector and the vector using the following formula:

$$k = \mathrm{argmin}_i \{|g_i - g_{worst}|\}$$

where $|g_i - g_{worst}|$ represents the Euclidian distance between the two vectors.

Based on the comparison, power restoration platform 130 may determine a distance (e.g., the Euclidian distance) between the particular vector and the vector for the inactive site. As shown in FIG. 1F, power restoration platform 130 may determine that inactive site 2 (second inactive site 110) has the shortest distance to the particular vector, followed by inactive site 1 (first inactive site 105), and so on.

Figure 1G:
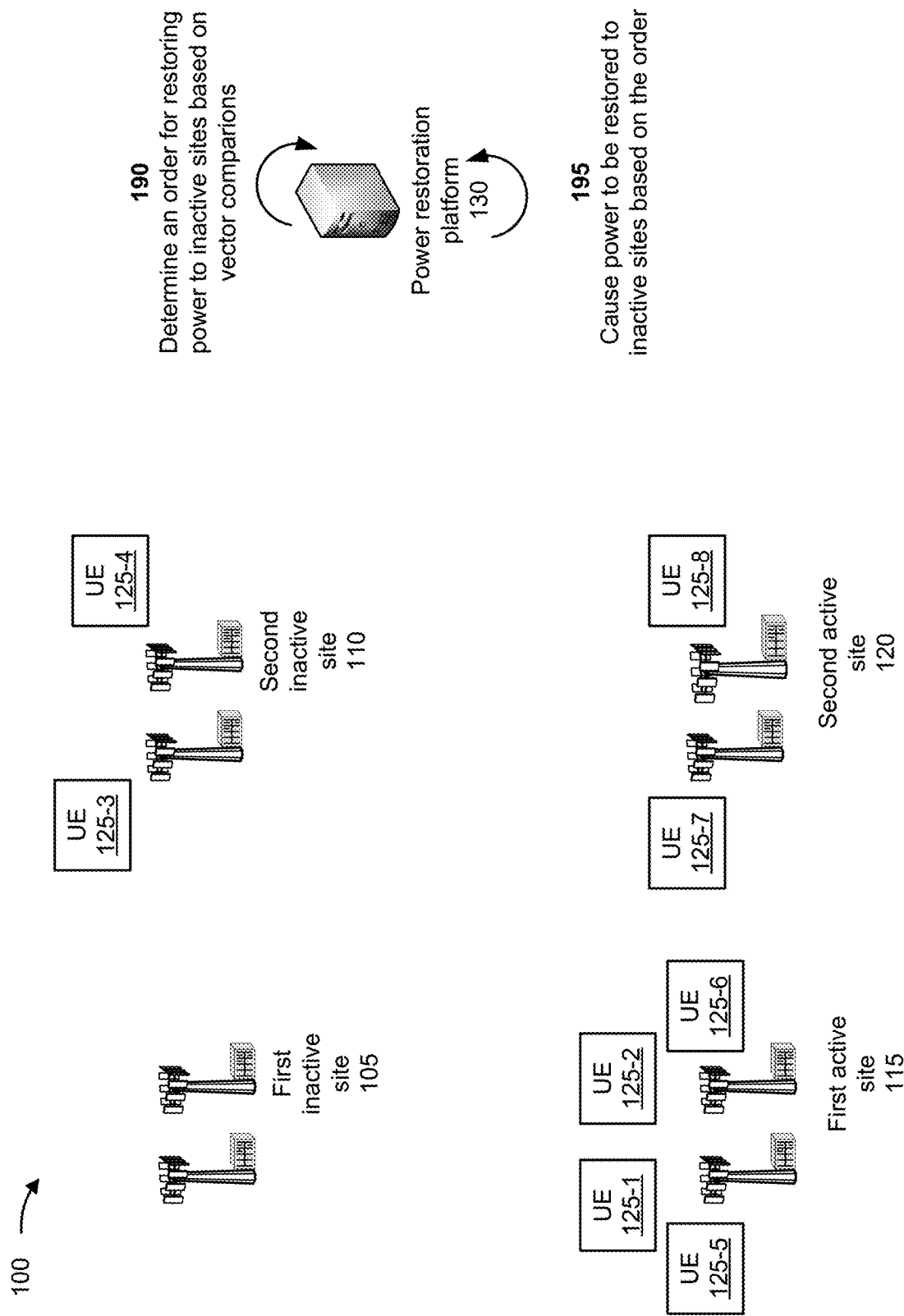

As shown in FIG. 1G, and by reference number 190, power restoration platform 130 may determine an order for restoring power to inactive sites based on vector comparisons. For example, power restoration platform 130 may determine the order for restoring power to the inactive sites based on the distances determined as a result of the vector comparisons. For example, power restoration platform 130 may determine that a first inactive site with a shortest distance is to be restored first, followed by a second inactive site with a second shortest distance, and so on. As explained above, power restoration platform 130 may determine that inactive site 2 (second inactive site 110) has the shortest distance to the particular vector, followed by inactive site 1 (first inactive site 105), and so on. Accordingly, power restoration platform 130 may determine that inactive site 2 (second inactive site 110) is to be restored first, followed by inactive site 1 (first inactive site 105), and so on.

As shown in FIG. 1G, and by reference number 195, power restoration platform 130 may cause power to be restored to inactive sites based on the order. For example, power restoration platform 130 may provide information identifying the order for restoring power to a device associated with a field engineer. In some examples, the device may provide instructions to power generating equipment to restore power to the inactive sites based on the order. Alternatively, the information may instruct a field engineer to cause power to be restored to the inactive sites based on the order.

While examples have been described herein with respect to KPIs with relatively low values, in some situations, some KPIs may be indicating a better performance when the values are relatively high. A KPI associated with data throughput may be an example of such KPI. In this regard, the values of such KPIs may be adjusted such that low values of such KPIs are indicative of a better performance. By prioritizing power restoration in this manner, implementations described herein preserve resources that would have been consumed by re-determining a proper for restoring the sites, by identifying additional power generating equipment and providing power to sites that should been prioritized, by remedying network issues created by restoring power to sites in an improper order, among other examples.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
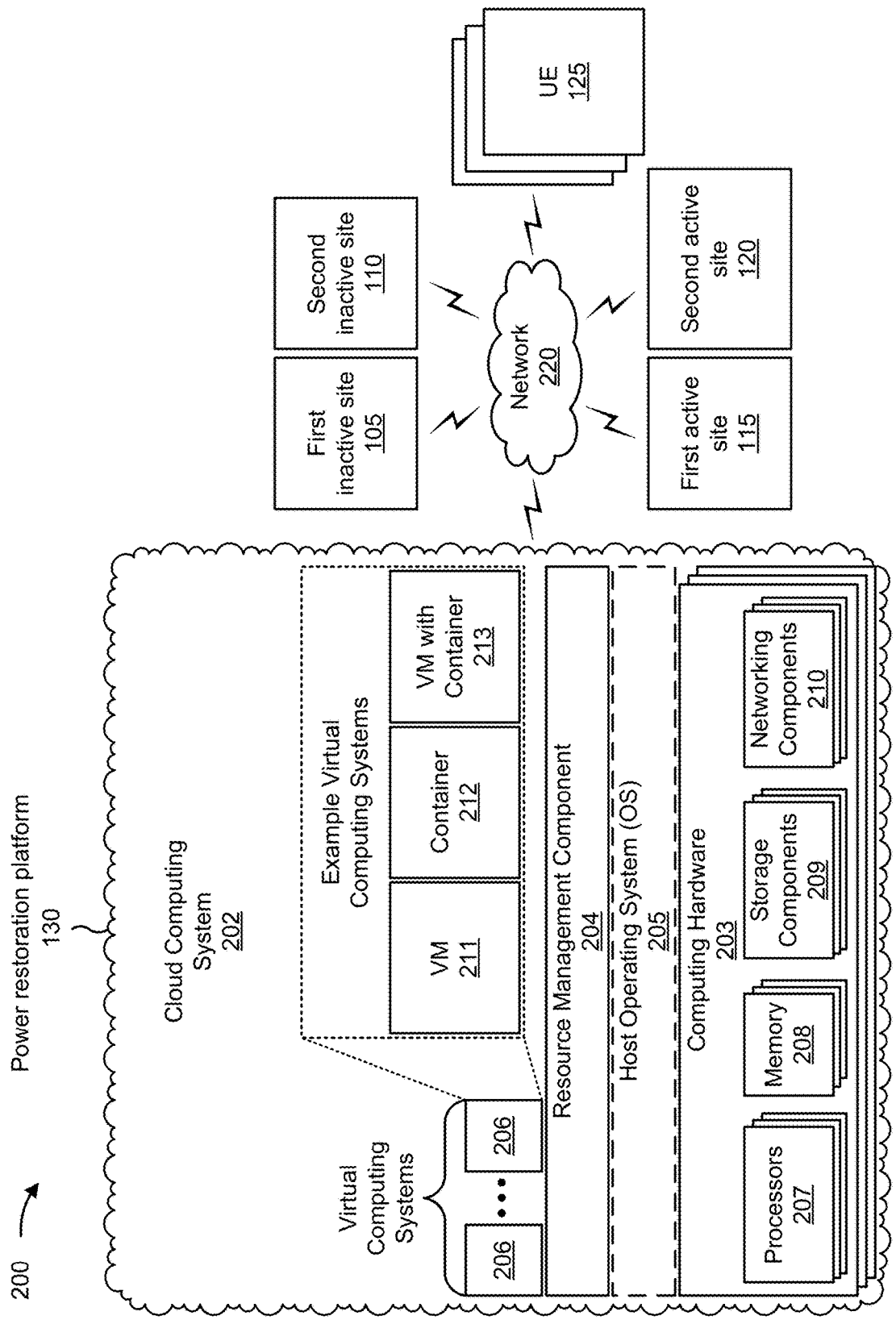
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a power restoration platform 130, which may include one or more elements of and/or may execute within a cloud computing system 202. The cloud computing system 202 may include one or more elements 203-213, as described in more detail below. As further shown in FIG. 2, environment 200 may include first inactive site 105, second inactive site 110, first active site 115, second active site 120, UEs 125, and a network 220. Some devices and/or elements of environment 200 have been described above in connection with FIGS. 1A-1G. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although power restoration platform 130 may include one or more elements 203-213 of the cloud computing system 202, may execute within the cloud computing system 202, and/or may be hosted within the cloud computing system 202, in some implementations, power restoration platform 130 may not be cloud-based (e.g., may be implemented outside of a cloud computing system) or may be partially cloud-based. For example, power restoration platform 130 may include one or more devices that are not part of the cloud computing system 202, such as device 300 of FIG. 3, which may include a standalone server or another type of computing device. Power restoration platform 130 may perform one or more operations and/or processes described in more detail elsewhere herein.

UE 125 includes one or more devices capable of receiving, generating, storing, processing, and/or providing information associated with prioritizing power restoration to sites, as described elsewhere herein. UE 125 may include a communication device and a computing device. For example, UE 125 may include a wireless communication device, a mobile phone, or a similar type of device.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

First inactive site 105 may include one or more base stations. The one or more base stations may include one or more eNodeBs, or one or more gNodeBs, among other examples. First inactive site 105 may be a site (e.g., a cell site) that is experiencing a power outage. Second inactive site 110 may be similar to first inactive site 105. First active site 115 may include one or more base stations. The one or more base stations may include one or more eNodeBs, or one or more gNodeBs, among other examples. First active site 115 may be a site (e.g., a cell site) that is not experiencing a power outage (e.g., a site that is in service during the power outage). Second active site 120 may be similar to first active site 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
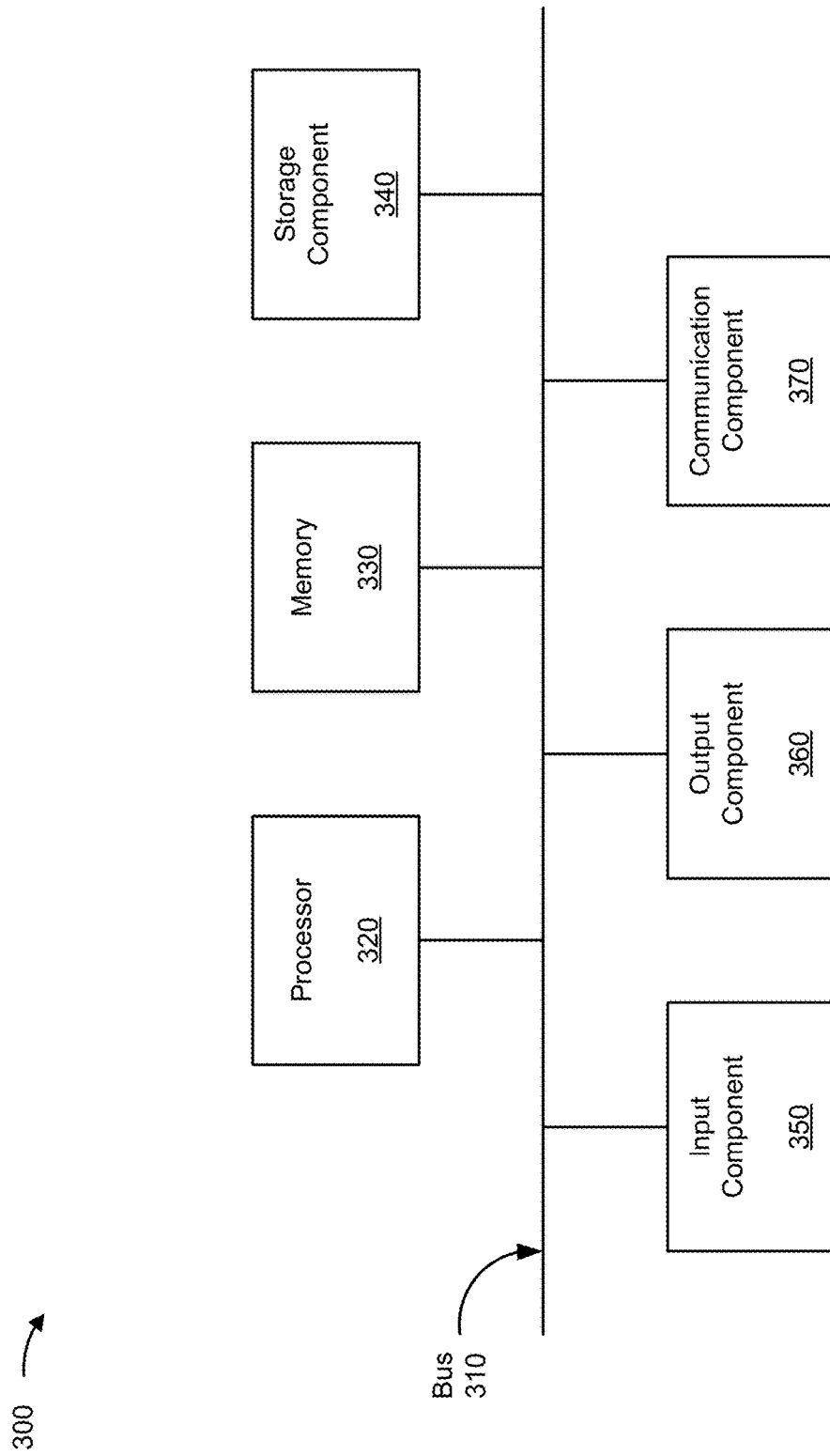
FIG. 3 is a diagram of example components of one or more devices of FIG. 2.

FIG. 3 is a diagram of example components of a device 300, which may correspond to power restoration platform 130, first inactive site 105, second inactive site 110, first active site 115, second active site 120, and/or UEs 125. In some implementations, first inactive site 105, second inactive site 110, first active site 115, second active site 120, and/or UEs 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
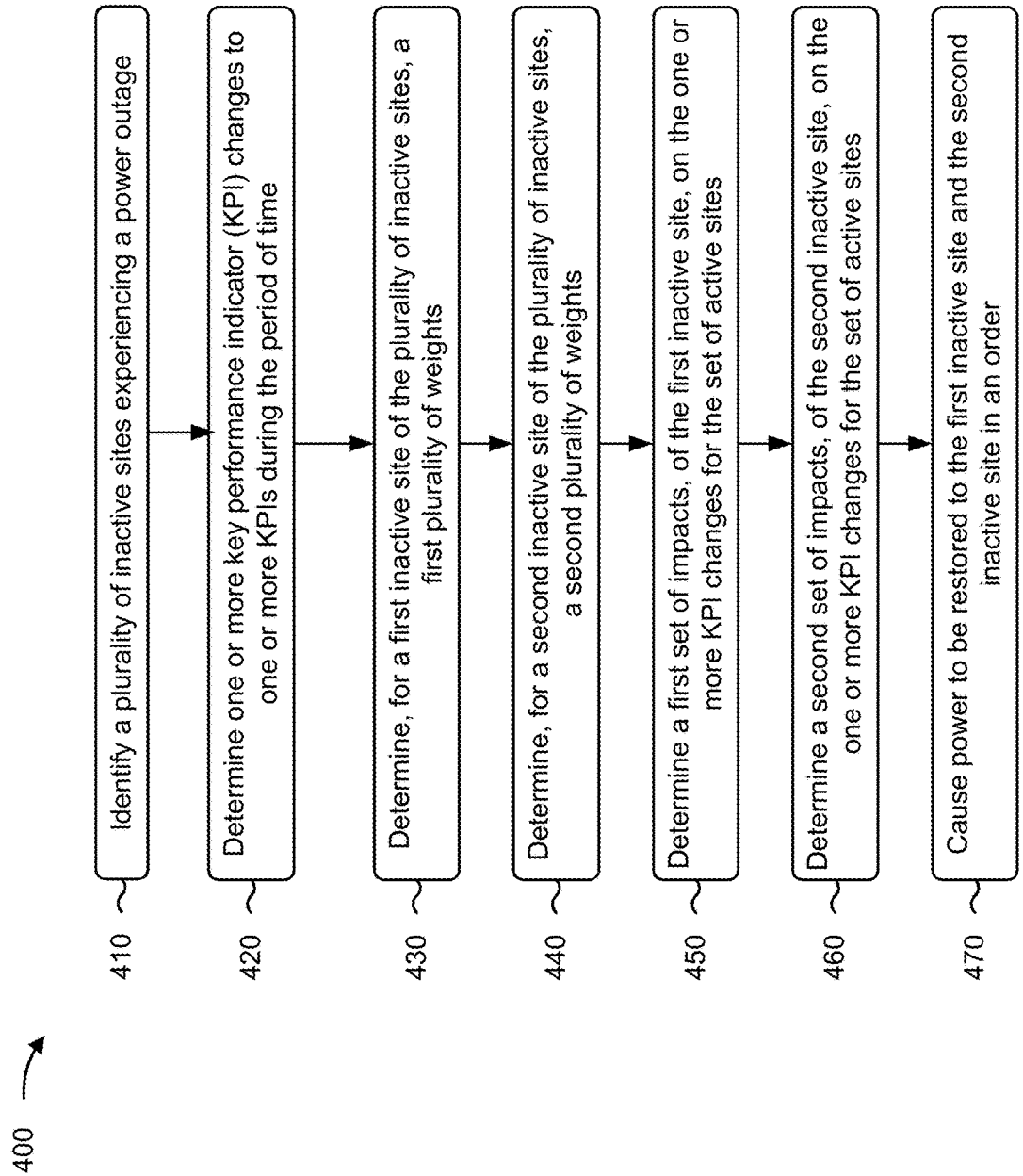
FIG. 4 is a flowchart of an example process relating to prioritizing power restoration to sites after a power outage.

FIG. 4 is a flowchart of an example process 400 relating to prioritizing power restoration to sites. In some implementations, one or more process blocks of FIG. 4 may be performed by a power restoration platform (e.g., power restoration platform 130). In some implementations, one or more process blocks of FIG. 4 may be performed by another device or a group of devices separate from or including the power restoration platform, such as a first inactive site 105 (e.g., first inactive site 105), a second inactive site (e.g., second inactive site 110), a first active site (e.g., first active site 115), a second active site (e.g., second active site 120), and/or UEs (e.g., UEs 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying a plurality of inactive sites experiencing a power outage during a period of time (block 410). Each of the plurality of inactive sites includes one or more base stations.

As further shown in FIG. 4, process 400 may include determining one or more KPI changes to one or more KPIs during the period of time for each active site of a set of active sites that are in service (block 420). The one or more KPI changes, for each active site, are caused by one or more inactive sites that are experiencing the power outage, as described above. In some implementations, the one or more KPI changes, for each active site, are caused by one or more inactive sites, of the plurality of inactive sites, experiencing the power outage.

As further shown in FIG. 4, process 400 may include determining, for a first inactive site of the plurality of inactive sites, a first plurality of weights associated with the first inactive site experiencing the power outage (block 430).

As further shown in FIG. 4, process 400 may include determining, for a second inactive site of the plurality of inactive sites, a second plurality of weights associated with the second inactive site experiencing the power outage (block 440).

As further shown in FIG. 4, process 400 may include determining a first set of impacts, of the first inactive site, on the one or more KPI changes for the set of active sites based on the first plurality of weights (block 450).

As further shown in FIG. 4, process 400 may include determining a second set of impacts, of the second inactive site, on the one or more KPI changes for the set of active sites based on the second plurality of weights (block 460).

As further shown in FIG. 4, process 400 may include causing power to be restored to the first inactive site and the second inactive site in an order that is based on the first set of impacts and the second set of impacts (block 470).

In some implementations, the period of time is a second period of time that follows a first period of time. Process 400 may include determining the first plurality of weights comprises determining a first number of UEs that were connected to the first inactive site during the first period of time and that are connected to a first active site of the set of active sites during the second period of time. Process 400 may further include determining a second number of UEs connected to the first active site during the second period of time. The second number is a total number of UEs connected to the first active site during the second period of time. Process 400 may further include determining, for the first inactive site, a weight associated with the one or more KPI changes for the first active site. The weight may be determined based on the first number of UEs and the second number of UEs.

In some implementations, process 400 includes determining the second period of time as a period of time associated with a highest number of UEs connected to the first inactive site out of periods of time preceding the first period of time.

In some implementations, causing power to be restored to the first inactive site and the second inactive site comprises comparing a first vector associated with impacts on KPIs and a second vector associated with the first set of impacts, comparing the first vector and a third vector associated with the second set of impacts, and causing power to be restored to the first inactive site and the second inactive site in an order that is based on based on comparing the first vector and the second vector, and comparing the first vector and the third vector.

In some implementations, causing power to be restored to the first inactive site and the second inactive site comprises adjusting a magnitude of each impact of the first set of impacts to obtain an adjusted first set of impacts, adjusting a magnitude of each impact of the second set of impacts to obtain an adjusted second set of impacts, and causing power to be restored to the first inactive site and the second inactive site in an order that is based on the adjusted first set of impacts and the adjusted second set of impacts.

In some implementations, the period of time is a second period of time that follows a first period of time, and process 400 includes determining a first number of UEs, connected to the first inactive site during the first period of time, that are connected to a first active site during the second period of time. Process 400 further includes determining a second number of UEs, connected to the first inactive site during the second period of time, that are connected to a second active site during the second period of time. Process 400 further includes including the first active site and the second active site in the set of active sites based on the first number of UEs and the second number of UEs.

In some implementations, the one or more KPI changes, for each active site, are caused by a respective portion of the UEs connected to the active site. In some implementations, process 400 includes determining a first weight associated with a first portion of the UEs connected to a first active site of the set of active sites. Process 400 further includes determining a second weight associated with a second portion of the UEs connected to a second active site of the set of active sites.

In some implementations, determining the one or more KPI changes to one or more KPIs for each active site of the set of active sites comprises determining an increase in an amount of energy consumed by an active site during the period of time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a power restoration platform, the method comprising:
   identifying a plurality of inactive sites experiencing a power outage during a second period of time that follows a first period of time, wherein each of the plurality of inactive sites includes one or more base stations;
   determining one or more key performance indicator (KPI) changes to one or more KPIs, during the second period of time, for each active site of a set of active sites that are in service,
      wherein the one or more KPI changes, for each active site, are caused by one or more inactive sites experiencing the power outage, and wherein the one or more inactive sites are included in the plurality of inactive sites;
   determining, for a first inactive site of the plurality of inactive sites, a first plurality of weights associated with the first inactive site experiencing the power outage,
      wherein a weight associated with the one or more KPI changes for the first inactive site is determined based on:
         a first number of user equipments (UEs) that were connected to the first inactive site during the first period of time and that are connected to a first active site of the set of active sites during the second period of time, and
         a second number of UEs connected to the first active site during the second period of time;
   determining, for a second inactive site of the plurality of inactive sites, a second plurality of weights associated with the second inactive site experiencing the power outage;
   determining a first set of impacts of the first inactive site on the one or more KPI changes for the set of active sites based on the first plurality of weights;
   determining a second set of impacts of the second inactive site on the one or more KPI changes for the set of active sites based on the second plurality of weights; and
   causing power to be restored to the first inactive site and the second inactive site in an order that is based on the first set of impacts and the second set of impacts.

2. The method of claim 1,
   wherein determining the first plurality of weights comprises:
      determining the first number of UEs that were connected to the first inactive site during the first period of time and that are connected to the first active site of the set of active sites during the second period of time; and
      determining the second number of UEs connected to the first active site during the second period of time, p3 wherein the second number is a total number of UEs connected to the first active site during the second period of time.

3. The method of claim 2, further comprising:
   determining the second period of time as a period of time associated with a highest number of UEs connected to the first inactive site out of periods of time preceding the first period of time.

4. The method of claim 1, wherein causing power to be restored to the first inactive site and the second inactive site comprises:
   comparing a first vector associated with impacts on KPIs and a second vector associated with the first set of impacts;
   comparing the first vector and a third vector associated with the second set of impacts; and
   causing power to be restored to the first inactive site and the second inactive site in an order that is based on:
      comparing the first vector and the second vector, and
      comparing the first vector and the third vector.

5. The method of claim 1, wherein causing power to be restored to the first inactive site and the second inactive site comprises:
   adjusting a magnitude of each impact of the first set of impacts to obtain an adjusted first set of impacts;
   adjusting a magnitude of each impact of the second set of impacts to obtain an adjusted second set of impacts; and
   causing power to be restored to the first inactive site and the second inactive site in an order that is based on the adjusted first set of impacts and the adjusted second set of impacts.

6. The method of claim 1,
   wherein the method further comprises:
      determining a first number of user equipments that are connected to a first active site during the second period of time, wherein the first number of user equipments are connected to the first inactive site during the first period of time;

determining a second number of user equipments that are connected to a second active site during the second period of time, wherein the second number of user equipments are connected to the first inactive site during the second period of time; and including the first active site and the second active site in the set of active sites based on the first number of user equipments and the second number of user equipments.

7. The method of claim 1, wherein determining the one or more KPI changes to one or more KPIs for each active site of the set of active sites comprises:

determining an increase in an amount of energy consumed by an active site during the period of time.

8. A device, comprising:

one or more processors configured to:

determine a number of user equipments (UEs) connected to an inactive site during a first period of time, wherein the inactive site includes one or more base stations;

determine that the inactive site experienced a power outage during a second period of time subsequent to the first period of time;

determine that the UEs transitioned from being connected to the inactive site to being connected to a set of active sites during the second period of time;

determine one or more key performance indicator (KPI) changes to one or more KPIs, during the second period of time, for each active site of the set of active sites, wherein the one or more KPI changes, for each active site, are caused by a respective portion of the UEs connected to the active site;

determine a plurality of weights associated with the inactive site experiencing the power outage;

determine a set of impacts of the inactive site on the one or more KPI changes for the set of active sites based on the plurality of weights; and cause power to be restored to the inactive site based on a distance between a first vector associated with impacts on KPIs and a second vector associated with the set of impacts.

9. The device of claim 8, wherein the one or more processors, to determine the plurality of weights, are configured to:

determine a first weight associated with a first portion of the UEs connected to a first active site of the set of active sites; and determine a second weight associated with a second portion of the UEs connected to a second active site of the set of active sites.

10. The device of claim 8, wherein the one or more processors are further configured to:

determine a first number of the UEs that are connected to a first active site;

determine a second number of the UEs that are connected to a second active site; and include the first active site and the second active site in the set of active sites based on the first number of the UEs and the second number of the UEs.

11. The device of claim 8, wherein the one or more processors, to determine the set of impacts, are configured to:

determine a first impact, on a first KPI change to a first KPI, for each active site of the set of active sites based on a respective weight of the plurality of weights; and determine a second impact, on a second KPI change to a second KPI, for each active site of the set of active sites based on a respective weight of the plurality of weights.

12. The device of claim 11, wherein the first KPI is a KPI relating to accessibility of a network associated with the set of active sites, and wherein the second KPI is a KPI relating to experience of users while utilizing the network.

13. The device of claim 8, wherein the one or more processors, to determine the set of impacts, are configured to:

determine an increase in an amount of energy consumed by each active site, of the set of active sites, during the first period of time.

14. The device of claim 8, wherein the one or more processors, to cause power to be restored, are configured to:

determine the distance between the first vector associated with impacts on KPIs and the second vector associated with the set of impacts; and cause power to be restored to the inactive site before another inactive site based on the distance.

15. A non-transitory computer-readable medium storing a set of instructions, the set of instructions comprising:

one or more instructions that, when executed by one or more processors of a device, cause the device to:

determine a number of user equipments (UEs) connected to an inactive site during a first period of time, wherein the inactive site includes one or more base stations;

determine that the inactive site is experiencing a power outage during a second period of time subsequent to the first period of time;

determine that the UEs have transitioned from being connected to the inactive site to being connected to a set of active sites during the second period of time, the set of active sites including a first active site and a second active site in the set of active sites based on a first number, of the UEs that are connected to the first active site, and a second number, of the UEs that are connected to the second active site, satisfying a number threshold;

determine one or more key performance indicator (KPI) changes to one or more KPIs, during the second period of time, for each active site of the set of active sites, wherein the one or more KPI changes for each active site are caused by a respective portion of the UEs connected to the active site;

determine a plurality of weights associated with the inactive site experiencing the power outage;

determine a set of impacts of the inactive site on the one or more KPI changes for the set of active sites based on the plurality of weights; and determine whether power is to be restored for the inactive site based on the set of impacts.

16. The non-transitory computer-readable medium of claim 15, wherein the one or more instructions, when executed by the one or more processors, further cause the device to:

determine the first number of the UEs that are connected to the first active site;

determine the second number of the UEs that are connected to the second active site; and determine that the first number of the UEs and the second number of the UEs satisfy the number threshold.

17. The non-transitory computer-readable medium of claim 15, wherein the one or more instructions, when executed by the one or more processors, further cause the device to:
 determine the first period of time as a period of time associated with a highest number of UEs connected to the inactive site out of periods of time preceding the second period of time.

18. The non-transitory computer-readable medium of claim 15, wherein the one or more instructions, that cause the device to determine whether power is to be restored for the inactive site, cause the device to:
 compare a first vector associated with impacts on KPIs and a second vector associated with the set of impacts; and
 determine whether the power is to be restored for the inactive site based on comparing the first vector and the second vector.

19. The non-transitory computer-readable medium of claim 15, wherein the one or more instructions, when executed by the one or more processors, further cause the device to:
 adjust a magnitude of the set of impacts to obtain an adjusted set of impacts; and
 cause power to be restored to the inactive site based on the adjusted set of impacts.

20. The non-transitory computer-readable medium of claim 15, wherein the one or more KPIs include:
 a first KPI relating to accessibility of a network associated with the set of active sites,
 a second KPI relating to experience of users while utilizing the network, and
 a third KPI relating to retaining services of users.

* * * * *